(12) United States Patent
He

(10) Patent No.: US 12,363,792 B2
(45) Date of Patent: Jul. 15, 2025

(54) USER EQUIPMENT (UE)-INITIATED DISCONTINUOUS RECEPTION (DRX) MEDIUM ACCESS CONTROL (MAC) CONTROL ELEMENT (MAC-CE)

(71) Applicant: QUALCOMM Incorporated, San Diego, CA (US)

(72) Inventor: Linhai He, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 18/615,807

(22) Filed: Mar. 25, 2024

(65) Prior Publication Data
US 2024/0237140 A1 Jul. 11, 2024

Related U.S. Application Data

(63) Continuation of application No. 17/228,296, filed on Apr. 12, 2021, now Pat. No. 11,974,349.
(Continued)

(51) Int. Cl.
H04W 76/28 (2018.01)
H04L 1/1812 (2023.01)
H04W 52/02 (2009.01)

(52) U.S. Cl.
CPC .......... *H04W 76/28* (2018.02); *H04L 1/1812* (2013.01); *H04W 52/0225* (2013.01)

(58) Field of Classification Search
CPC . H04W 76/28; H04W 52/0225; H04W 72/21; H04W 52/0229; H04W 52/028;
(Continued)

(56) References Cited

U.S. PATENT DOCUMENTS

2008/0198795 A1  8/2008  Kim et al.
2010/0118752 A1  5/2010  Suzuki et al.
(Continued)

FOREIGN PATENT DOCUMENTS

| CN | 104254116 A | 12/2014 |
| CN | 110572842 A | 12/2019 |
| CN | 110876183 A | 3/2020 |

OTHER PUBLICATIONS

ETSI MCC: "Report of 3GPP TSG RAN2#105bis Meeting, Xi'an, China", 3GPP TSG-RAN WG2 Meeting #106, R2-1905501, Xi'an, China, Apr. 8, 2019-Apr. 12, 2019, May 14, 2019, pp. 1-225, No. 157-158 Page.
(Continued)

*Primary Examiner* — Walli Z Butt
(74) *Attorney, Agent, or Firm* — NORTON ROSE FULBRIGHT US LLP

(57) ABSTRACT

This disclosure provides systems, methods, and apparatuses, including computer programs encoded on computer storage media, for wireless communication. In one aspect of the disclosure, a method of wireless communication includes determining, at a user equipment (UE), that a current data transmission to a network entity is complete. The method further includes transmitting, to the network entity and based on the determination, an indication to terminate a discontinuous reception (DRX) active time assigned to the UE. Other aspects and features are also claimed and described.

20 Claims, 6 Drawing Sheets

Related U.S. Application Data

(60) Provisional application No. 63/021,796, filed on May 8, 2020.

(58) Field of Classification Search
CPC .. H04W 52/0216; H04L 1/1812; H04L 1/188; H04L 1/1887; Y02D 30/70
See application file for complete search history.

(56) References Cited

U.S. PATENT DOCUMENTS

| | | | | |
|---|---|---|---|---|
| 2017/0118793 | A1* | 4/2017 | Liu | H04W 76/28 |
| 2021/0203468 | A1* | 7/2021 | Yi | H04W 72/0453 |
| 2021/0352757 | A1 | 11/2021 | He | |
| 2022/0225151 | A1* | 7/2022 | Zhang | H04W 24/10 |
| 2022/0338118 | A1 | 10/2022 | Jang et al. | |
| 2023/0040041 | A1* | 2/2023 | Jin | H04W 52/367 |

OTHER PUBLICATIONS

ERICSSON: "Running MAC CR for NR-U", 3GPP TSG-RAN2 #107bis, R2-1913509, 3rd Generation Partnership Project (3GPP), Mobile Competence Centre, 650, Route Des Lucioles, F-06921 Sophia-Antipolis Cedex, France, vol. RAN WG2. No. Chongqing, China, Oct. 14, 2019-Oct. 18, 2019, Oct. 3, 2019 (Oct. 3, 2019), XP051804304, Section 5.4.1, Section 5.7 Starting in p. 35. pp. 1-80.
ETSI MCC: "Report of 3GPP TSG RAN2#105bis Meeting, Xi'an, China", 3GPP Draft, R2-1905501, 3GPP TSG-RAN WG2 Meeting #106, 3rd Generation Partnership Project (3GPP), Mobile Competence Centre, 650, Route Des Lucioles, F-06921 Sophia-Antipolis Cedex, France, vol. RAN WG2, No. Xi'an, China, Apr. 8, 2019-Apr. 12, 2019, May 13, 2019, XP051729007, pp. 1-225, p. 157, Section 11.11.3, Lines 10-16, and p. 84, 93, 199, Line 16.
International Preliminary Report on Patentability—PCT/US2021/026958 The International Bureau of WIPO—Geneva, Switzerland, Nov. 17, 2022.
International Search Report and Written Opinion—PCT/US2021/026958—ISA/EPO—Jun. 22, 2021.
Rapporteur (Qualcomm Incorporated): "Running Stage-2 CR for NR Shared Spectrum", 3GPP Draft, R2-2002361, 3GPP TSG-RAN1 #100e, 3rd Generation Partnership Project (3GPP), Mobile Competence Centre, 650, Route Des Lucioles, F-06921 Sophia-Antipolis Cedex, France, vol. RAN WG1, No. Feb. 24, 2020-Mar. 6, 2020, Mar. 11, 2020 (Mar. 11, 2020), XP051864882, 21 Pages, section 11 in p. 12.
European Search Report—EP25150057—Search Authority—Munich—Apr. 11, 2025.

* cited by examiner

USER EQUIPMENT (UE)-INITIATED DISCONTINUOUS RECEPTION (DRX) MEDIUM ACCESS CONTROL (MAC) CONTROL ELEMENT (MAC-CE)

CROSS-REFERENCE TO RELATED APPLICATIONS

This application is a continuation of, and claims benefit of, U.S. patent application Ser. No. 17/228,296, entitled, "USER EQUIPMENT (UE)-INITIATED DISCONTINUOUS RECEPTION (DRX) MEDIUM ACCESS CONTROL (MAC) CONTROL ELEMENT (MAC-CE)," filed Apr. 12, 2021, and also claims the benefit of U.S. Provisional Patent Application No. 63/021,796, entitled, "USER EQUIPMENT (UE)-INITIATED DISCONTINUOUS RECEPTION (DRX) MEDIUM ACCESS CONTROL (MAC) CONTROL ELEMENT (MAC-CE)," filed on May 8, 2020, which are expressly incorporated by reference herein in their entirety.

TECHNICAL FIELD

Aspects of the present disclosure relate generally to wireless communication systems, and more particularly, to user equipment (UE)-initiated discontinuous reception (DRX) medium access control (MAC) control elements (MAC-CEs).

BACKGROUND

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

In fifth generation (5G) new radio (NR) wireless communication systems, UEs may be configured to conserve power by entering a low power operating mode (e.g., a "sleep" mode) when a discontinuous reception (DRX) timer expires or when the UEs receive a DRX medium access control (MAC) control element (MAC-CE) from a base station. The base station may transmit the DRX MAC-CE to the UE based on a determination that there is no more data to be transmitted to the UE by the base station, and thus the UE may enter the low power operating mode. However, for at least some applications, data communicated between the UE and the base station may be predominately transmitted by the UE to the base station in an uplink (UL) data session. The base station may not know when the UE has finished the UL data session, which may result in the base station failing to transmit a DRX MAC-CE to the UE, thereby preventing the UE from entering the low power operating mode, and reducing power consumption, prior to expiration of the DRX timer even though there is no more data to be communicated between the UE and the base station.

SUMMARY

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication includes determining, at a user equipment (UE), that a current data transmission to a network entity is complete. The method further includes transmitting, to the network entity and based on the determination, an indication to terminate a discontinuous reception (DRX) active time assigned to the UE.

In an additional aspect of the disclosure, an apparatus configured for wireless communication is disclosed. The apparatus includes at least one processor, and a memory coupled to the at least one processor. The at least one processor is configured to determine, at a UE, that a current data transmission to a network entity is complete. The at least one processor is further configured to initiate transmission, to the network entity and based on the determination, of an indication to terminate a DRX active time assigned to the UE.

In an additional aspect of the disclosure, an apparatus configured for wireless communication is disclosed. The apparatus includes means for determining, at a UE, that a current data transmission to a network entity is complete. The apparatus further includes means for transmitting, to the network entity and based on the determination, an indication to terminate a DRX active time assigned to the UE.

In an additional aspect of the disclosure, a non-transitory computer-readable medium stores instructions that, when executed by a processor, cause the processor to perform operations including determining, at a UE, that a current data transmission to a network entity is complete. The operations further include initiating transmission, to the network entity and based on the determination, of an indication to terminate a DRX active time assigned to the UE.

In an additional aspect of the disclosure, a method of wireless communication includes receiving, at a network entity from a UE, an indication to terminate a DRX active time assigned to the UE. The method further includes determining whether to terminate the DRX active time based on whether a current data transmission to the UE is complete.

In an additional aspect of the disclosure, an apparatus configured for wireless communication is disclosed. The apparatus includes at least one processor, and a memory coupled to the at least one processor. The at least one processor is configured to receive, at a network entity from a UE, an indication to terminate a DRX active time assigned to the UE. The at least one processor is further configured to determine whether to terminate the DRX active time based on whether a current data transmission to the UE is complete.

In an additional aspect of the disclosure, an apparatus configured for wireless communication is disclosed. The apparatus includes means for receiving, at a network entity from a UE, an indication to terminate a DRX active time assigned to the UE. The apparatus further includes means for determining whether to terminate the DRX active time based on whether a current data transmission to the UE is complete.

In an additional aspect of the disclosure, a non-transitory computer-readable medium stores instructions that, when executed by a processor, cause the processor to perform operations including receiving, at a network entity from a UE, an indication to terminate a DRX active time assigned to the UE. The operations further include determining whether to terminate the DRX active time based on whether a current data transmission to the UE is complete.

Other aspects, features, and implementations will become apparent to those of ordinary skill in the art, upon reviewing the following description of specific, exemplary aspects in conjunction with the accompanying figures. While features may be discussed relative to certain aspects and figures below, all aspects can include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects the exemplary aspects can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
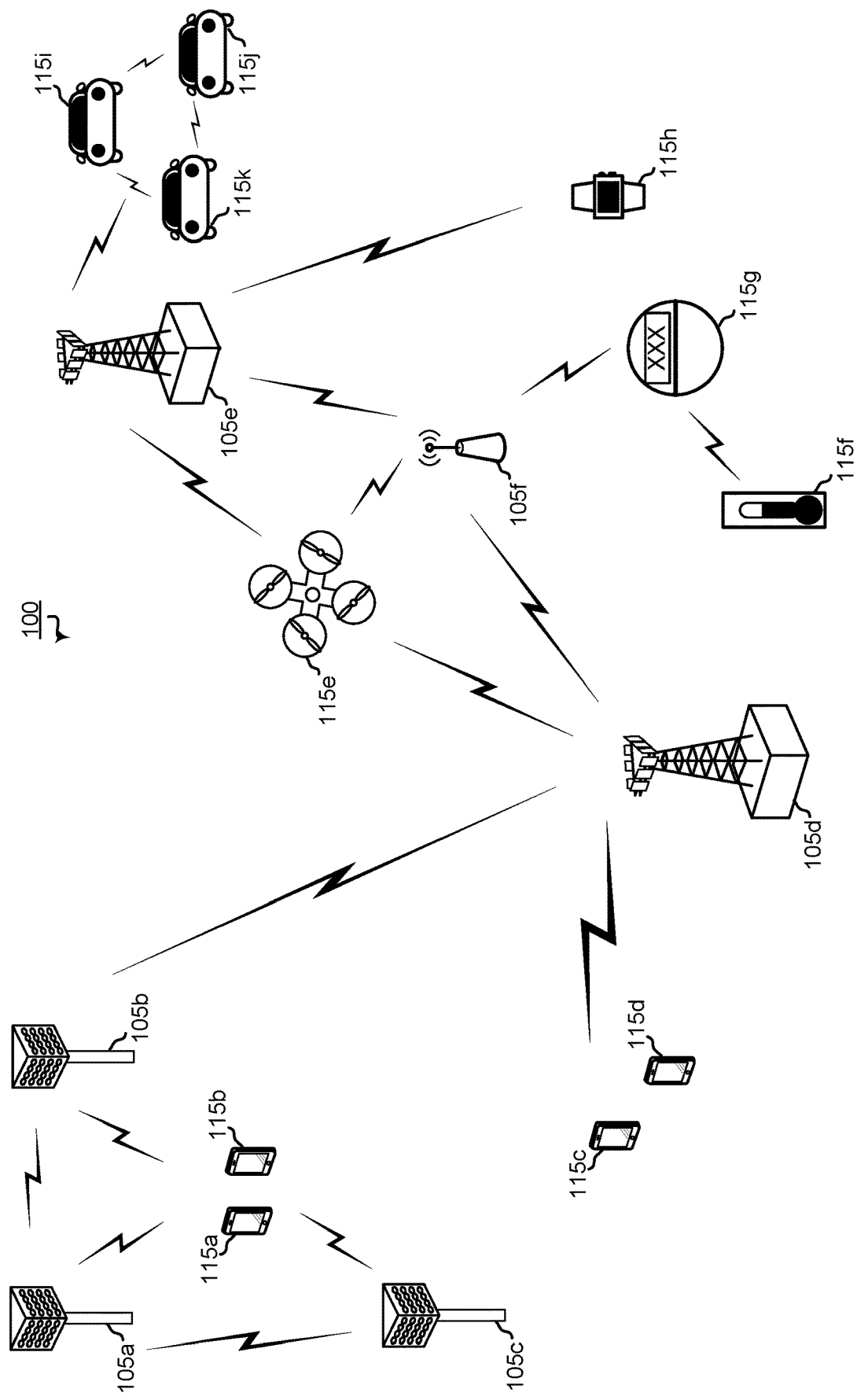
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media for enabling user equipment (UE)-initiated discontinuous reception (DRX) medium access control (MAC) control elements (MAC-CEs). For example, a UE described herein may be configured to determine that a current data transmission (e.g., transmission of one or more data packets, such as during an uplink (UL) data session or an UL data burst) with a network entity, such as a base station, is completed. In some implementations, the UE may determine that the current data transmission is completed based on a determination that a buffer configured to store data for transmission to the network entity is empty. In some other alternatives, the determination may be based on an indication from an application executed by the UE. Based on this determination, the UE may transmit a DRX MAC-CE to the network entity. The DRX MAC-CE may indicate that a DRX active time is to be terminated at the UE. In some implementations, the indication may include a one-byte MAC-CE that is included as padding in a physical uplink shared channel (PUSCH) transmission to the network entity and that includes a logical channel identifier (ID) associated with the UE.

In some implementations, the network entity may authorize the UE to terminate the DRX active time based on the DRX MAC-CE from the UE. For example, the network entity may transmit a downlink communication to the UE based on a determination that a current downlink (DL) transmission (e.g., transmission of one or more data packets, such as during a DL data session or a DL data burst) is complete. In some implementations, the determination is based on a determination that there is no data stored at the network entity for transmission to the UE (e.g., that a buffer at the network entity configured to store data for transmission to the UE is empty). Based on the downlink communication from the network entity, the UE may terminate the DRX active time and transition into a low power operating mode (e.g., a "sleep" mode) to conserve power. If the UE does not receive the downlink communication from the network entity, the UE may remain in an active operating mode.

In some other implementations, the UE may determine whether to terminate the DRX active time instead of relying on authorization from the network entity. To illustrate, the UE may initiate a transmission timer based on transmitting the DRX MAC-CE to the network entity. If the transmission timer expires without the UE receiving a DL communication from the network entity, the UE may enter the low power operating mode. If the UE receives a DL communication, such as a message scheduling or including DL data or a hybrid automatic request (HARQ) retransmission grant, from the network entity, the UE may maintain the active operating mode to receive or transmit additional data.

Particular implementations of the subject matter described in this disclosure can be implemented to realize one or more of the following potential advantages. In some aspects, the present disclosure provides techniques for enabling UE-initiated DRX MAC-CEs. For example, a UE may transmit a DRX MAC-CE to a network entity based on a determination that the UE has completed a current UL data transmission (e.g., an UL data session or an UL data burst). Transmitting the DRX MAC-CE may enable the UE to more quickly enter the low power operating mode than waiting for the network entity to determine that a data session is complete or for expiration of a DRX active timer. Entering the low power operating mode enables the UE to conserve power, as compared to remaining in the active operating mode. The techniques described herein may reduce power consumption at particular types of UEs that would otherwise not be able to reduce power consumption using DRX. As one example, UEs configured to perform extended reality (XR) applications (or augmented reality (AR) or virtual reality (VR) applications), or battery powered video cameras, may transmit a frame approximately every 33.3 milliseconds (ms). Transmitting each frame may takes approximately 10-15 milliseconds. If such UEs are assigned a typical 100 ms DRX active time, the UEs may not be able to enter the low power operating mode because a new frame will need to be transmitted before expiration of the DRX active time. As another example, wearable UEs, such as smart watches, fitness devices, etc., may benefit from entering the low power operating mode after a traffic burst is complete. However, the traffic burst may be driven by the UE, and the network entity may not know that the traffic burst is complete in order to instruct the UE to terminate the DRX active time before expiration of the DRX active timer, which may limit the amount of power saving at the UE.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. Additionally, an operator network may also include one or more long term evolution (LTE) networks, or one or more other networks. The various different network types may use different radio access technologies (RATs) and radio access networks (RANs).

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and Global System for Mobile Communications (GSM) are part of universal mobile telecommunication system (UMTS). In particular, LTE is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving the universal mobile telecommunications system (UMTS) mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Indeed, one or more aspects of the present disclosure are related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~ 1 millisecond (ms)), and users with wide ranges of mobility or lack thereof; and (3) with enhanced mobile broadband including extreme high capacity (e.g., ~ 10 Tbps/km$^2$), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) or frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHZ FDD or TDD implementations, subcarrier spacing may occur with 15 kHz, for example over 1, 5, 10, 20 MHZ, and the like bandwidth. For other various outdoor and small cell coverage deployments of TDD greater than 3 GHZ, subcarrier spacing may occur with 30 kHz over 80 or 100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHZ bandwidth.

The scalable numerology of 5G NR facilitates scalable TTI for diverse latency and quality of service (QOS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices, purchasing devices, medical devices, artificial intelligence (AI)-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g. radio frequency (RF)-chain, communication interface, processor), distributed arrangements, end-user devices, etc. of varying sizes, shapes, and constitution.

FIG. 1 is a block diagram illustrating details of an example wireless communication system. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105c are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component device or module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multi-point (COMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115c, which is a drone. Redundant communication links with UE 115e include from macro base stations 105d and 105c, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105c, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or FDD communications, such as in a vehicle-to-vehicle (V2V) mesh network between UEs 115$i$-115$k$ communicating with macro base station 105$c$.

Figure 2:
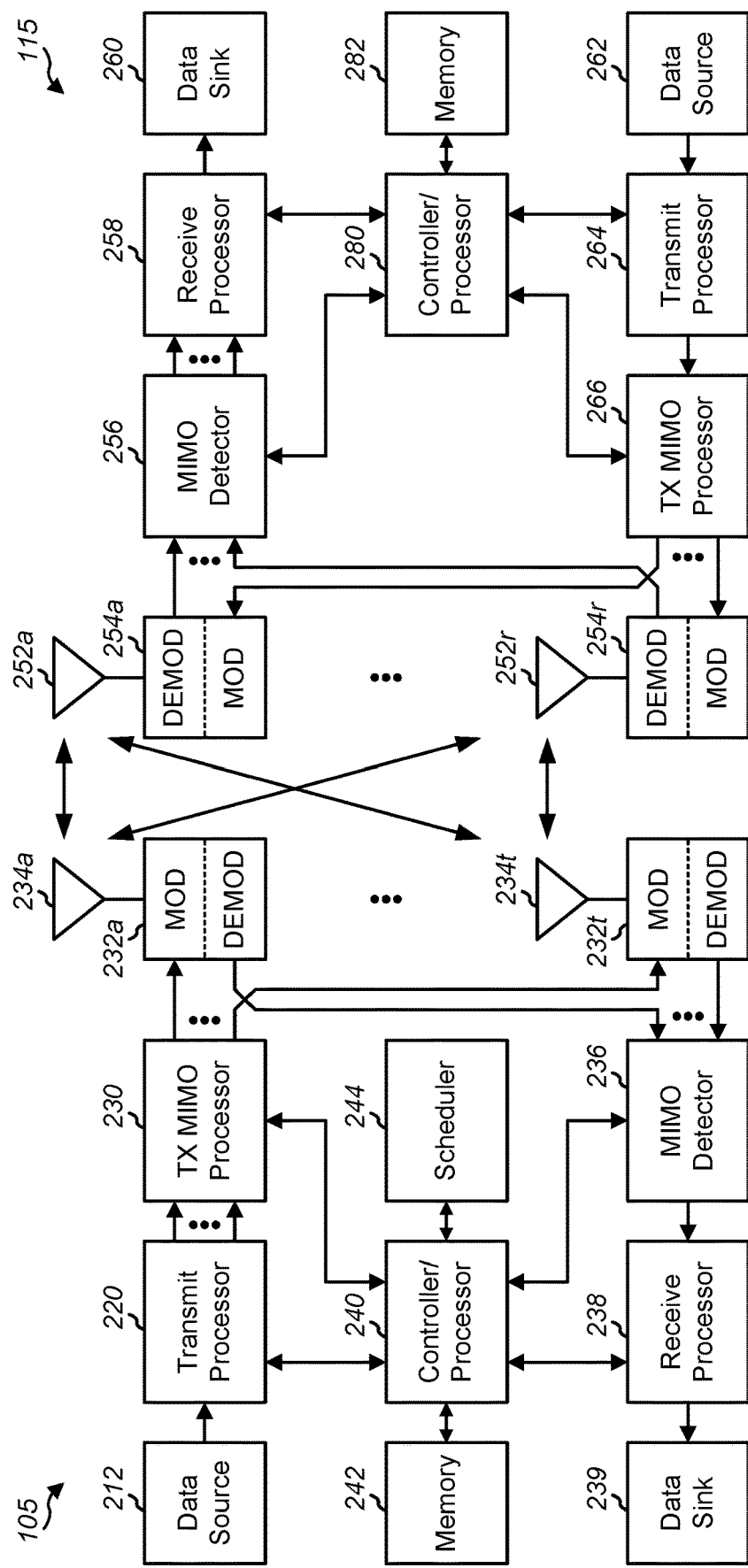
FIG. 2 is a block diagram illustrating examples of a base station and a UE configured according to one or more aspects of the present disclosure.

FIG. 2 shows a block diagram illustrating examples of base station 105 and UE 115 according to one or more aspects, which may be any of the base stations and one of the UEs in FIG. 1. For a restricted association scenario (as mentioned above), base station 105 may be small cell base station 105$f$ in FIG. 1, and UE 115 may be UE 115$c$ or 115D operating in a service area of base station 105$f$, which in order to access small cell base station 105$f$, would be included in a list of accessible UEs for small cell base station 105$f$. Base station 105 may also be a base station of some other type. As shown in FIG. 2, base station 105 may be equipped with antennas 234$a$ through 234$t$, and UE 115 may be equipped with antennas 252$a$ through 252$r$ for facilitating wireless communications.

At base station 105, transmit processor 220 may receive data from data source 212 and control information from controller 240 (e.g., a processor). The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for a primary synchronization signal (PSS) and a secondary synchronization signal (SSS), and a cell-specific reference signal. Transmit (TX) multiple-input multiple-output (MIMO) processor 230 may perform spatial processing (e.g., precoding) on the data symbols, the control symbols, or the reference symbols, if applicable, and may provide output symbol streams to modulators (MODs) 232$a$ through 232$t$. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232$a$ through 232$t$ may be transmitted via antennas 234$a$ through 234$t$, respectively.

At UE 115, the antennas 252$a$ through 252$r$ may receive the downlink signals from base station 105 and may provide received signals to demodulators (DEMODs) 254$a$ through 254$r$, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254$a$ through 254$r$, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to a controller 280 (e.g., a processor).

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may generate reference symbols for a reference signal. The symbols from transmit processor 264 may be precoded by TX MIMO processor 266 if applicable, further processed by modulators 254$a$ through 254$r$ (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 4 and 5, or other processes for the techniques described herein. Memories 242 and 282 may store data and program codes for base station 105 and UE 115, respectively. Scheduler 244 may schedule UEs for data transmission on the downlink or uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

The present disclosure provides systems, apparatus, methods, and computer-readable media for enabling UE-initiated discontinuous reception (DRX) medium access control (MAC) control elements (MAC-CEs). For example, a UE described herein may be configured to determine that a current data transmission (e.g., transmission of one or more data packets, such as during an uplink (UL) data session or an UL data burst) with a network entity, such as a base station, is completed. In some implementations, the UE may determine that the current data transmission is completed based on a determination that a buffer configured to store data for transmission to the network entity is empty. In some other implementations, the determination may be based on an indication from an application executed by the UE Based on this determination, the UE may transmit a DRX MAC-CE to the network entity. The DRX MAC-CE may indicate that a DRX active time is to be terminated at the UE. In some implementations, the indication may include a one-byte MAC-CE that is included as padding in a physical uplink shared channel (PUSCH) transmission to the network entity and that includes a logical channel identifier (ID) associated with the UE.

In some implementations, the network entity may authorize the UE to terminate the DRX active time based on the DRX MAC-CE from the UE. For example, the network entity may transmit a downlink communication to the UE based on a determination that a current downlink (DL) transmission (e.g., transmission of one or more data packets, such as during a DL data session or a DL data burst) is complete. In some implementations, the determination is based on a determination that there is no data stored at the network entity for transmission to the UE (e.g., that a buffer at the network entity configured to store data for transmission to the UE is empty). Based on the downlink communication from the network entity, the UE may terminate the DRX active time and transition into a low power operating mode (e.g., a "sleep" mode) to conserve power. If the UE does not receive the downlink communication from the network entity, the UE may remain in an active operating mode.

In some other implementations, the UE may determine whether to terminate the DRX active time instead of relying on authorization from the network entity. To illustrate, the UE may initiate a transmission timer based on transmitting the DRX MAC-CE to the network entity. If the transmission timer expires without the UE receiving a DL communication from the network entity, the UE may enter the low power operating mode. If the UE receives a DL communication, such as a message scheduling or including DL data or a hybrid automatic request (HARQ) retransmission grant, from the network entity, the UE may maintain the active operating mode to receive or transmit additional data.

Particular implementations of the subject matter described in this disclosure can be implemented to realize one or more of the following potential advantages. In some aspects, the present disclosure provides techniques for enabling UE-initiated DRX MAC-CEs. For example, a UE may transmit a DRX MAC-CE to a network entity based on a determination that the UE has completed a current UL data transmission (e.g., an UL data session or an UL data burst). Transmitting the DRX MAC-CE may enable the UE to more quickly enter the low power operating mode than waiting for the network entity to determine that a data session is complete or for expiration of a DRX active timer. Entering the low power operating mode enables the UE to conserve power, as compared to remaining in the active operating mode. The techniques described herein may reduce power consumption at particular types of UEs that would otherwise not be able to reduce power consumption using DRX. As one example, UEs configured to perform extended reality (XR) applications (or augmented reality (AR) or virtual reality (VR) applications), or battery powered video cameras, may transmit a frame approximately every 33.3 milliseconds (ms). Transmitting each frame may takes approximately 10-15 milliseconds. If such UEs are assigned a typical 100 ms DRX active time, the UEs may not be able to enter the low power operating mode because a new frame will need to be transmitted before expiration of the DRX active time. As another example, wearable UEs, such as smart watches, fitness devices, etc., may benefit from entering the low power operating mode after a traffic burst is complete. However, the traffic burst may be driven by the UE, and the network entity may not know that the traffic burst is complete in order to instruct the UE to terminate the DRX active time before expiration of the DRX active timer, which may limit the amount of power saving at the UE.

Figure 3:
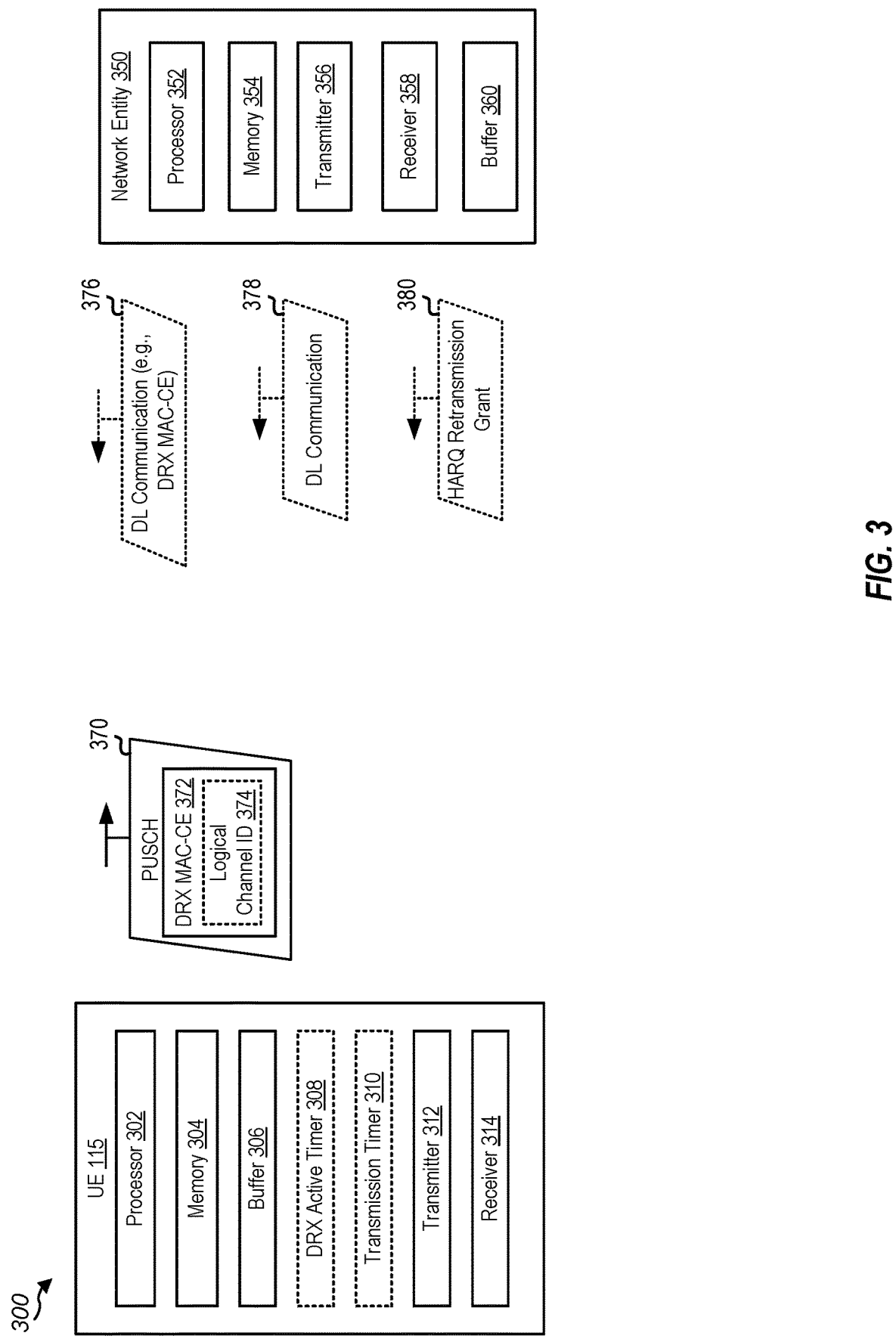
FIG. 3 is a block diagram illustrating an example wireless communication system that supports user equipment (UE)-initiated discontinuous reception (DRX) medium access control (MAC) control elements (MAC-CEs) according to one or more aspects.

FIG. 3 is a block diagram of an example wireless communications system 300 that supports UE-initiated DRX MAC-CEs according to one or more aspects. In some implementations, wireless communications system 300 may implement aspects of wireless network 100. Wireless communications system 300 includes UE 115 and a network entity 350. Network entity 350 may include or correspond to a base station, such as base station 105, a network, a network core, or another network device, as illustrative, non-limiting examples. Although one UE 115 and one network entity 350 are illustrated, in some other implementations, wireless communications system 300 may generally include multiple UEs 115, and may include more than one network entity 350.

UE 115 can include a variety of components (such as structural, hardware components) used for carrying out one or more functions described herein. For example, these components can include a processor 302, a memory 304, a buffer 306, an optional DRX active timer 308, an optional transmission timer 310, a transmitter 312, and a receiver 314. Processor 302 may be configured to execute instructions stored at memory 304 to perform the operations described herein. In some implementations, processor 302 includes or corresponds to controller 280, and memory 304 includes or corresponds to memory 282.

Buffer 306 may be configured to store data for transmission to network entity 350. For example, buffer 306 may be configured to store one or more data packets that are scheduled to be transmitted to network entity 350 as part of an UL data session or data burst. DRX active timer 308 may be configured to signal a duration of a DRX active time at UE 115. In some implementations, DRX active timer 308 has a duration of 100 ms. In other implementations, DRX active timer 308 has a different duration, such as 80 ms, 60 ms, or 40 ms, as non-limiting examples. Transmission timer 310 may be configured to signal a duration of a time period between UE 115 transmitting a DRX MAC CE and UE 115 terminating the DRX active time at UE 115. In some implementations, transmission timer 310 has a duration of approximately 4 ms.

Transmitter 312 is configured to transmit reference signals, control information, and data to one or more other devices, and receiver 314 is configured to receive reference signals, synchronization signals, control information, and data from one or more other devices. For example, transmitter 312 may transmit signaling, control information, and data, and receiver 314 may receive signaling, control information, and data, via a network, such as a wired network, a wireless network, or a combination thereof. For example, UE 115 may be configured to transmit or receive signaling, control information, and data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 312 and receiver 314 may be integrated in a transceiver. Additionally, or alternatively, transmitter 312, receiver 314, or both may include and correspond to one or more components of UE 115 described with reference to FIG. 2.

Network entity 350 can include a variety of components (such as structural, hardware components) used for carrying out one or more functions described herein. For example, these components can include a processor 352, a memory 354, a transmitter 356, a receiver 358, and a buffer 360. Processor 352 may be configured to execute instructions stored at memory 354 to perform the operations described herein. In some implementations, processor 352 includes or corresponds to controller 240, and memory 354 includes or corresponds to memory 242.

Transmitter 356 is configured to transmit reference signals, synchronization signals, control information, and data to one or more other devices, and receiver 358 is configured to receive reference signals, control information, and data from one or more other devices. For example, transmitter 356 may transmit signaling, control information, and data, and receiver 358 may receive signaling, control information, and data, via a network, such as a wired network, a wireless network, or a combination thereof. For example, network entity 350 may be configured to transmit or receive data via a direct device-to-device connection, a LAN, a WAN, a modem-to-modem connection, the Internet, intranet, extranet, cable transmission system, cellular communication network, any combination of the above, or any other communications network now known or later developed within which permits two or more electronic devices to communicate. In some implementations, transmitter 356 and receiver 358 may be integrated in a transceiver. Additionally, or alternatively, transmitter 356, receiver 358 or both may include and correspond to one or more components of base station 105 described with reference to FIG. 2.

Buffer 360 may be configured to store data for transmission to UE 115. For example, buffer 360 may be configured to store one or more data packets that are scheduled to be transmitted to UE 115 as part of a DL data session or data burst.

In some implementations, wireless communications system 300 implements a 5G New Radio (NR) network. For example, wireless communications system 300 may include multiple 5G-capable UEs 115 and multiple 5G-capable network entities 350, such as UEs and network entities configured to operate in accordance with a 5G NR network protocol such as that defined by the 3GPP.

During operation of the wireless communications system 300, UE 115 and network entity 350 may communicate control information and data via one or more wireless networks. For example, UE 115 may transmit one or more UL data packets to network entity 350 and may receive one or more DL data packets from network entity 350. The control information or data may be communicated as part of a data session between UE 115 and network entity 350.

Additionally, at an initiation of the data session, or upon a scheduled time to transmit UL data or receive DL data at UE 115, UE 115 may initiate DRX active timer 308. DRX active timer 308 may track a duration of a DRX active time at UE 115. During the DRX active time, UE 115 may be configured to maintain (e.g., remain in) an active operating mode. For example, UE 115 may maintain power to processor 302, transmitter 312, receiver 314, one or more other components, portions thereof, or a combination thereof, in order to monitor one or more channels, such as a physical downlink control channel (PDCCH), a physical downlink shared channel (PDSCH), or another channel. By remaining in the active operating mode and monitoring the PDCCH, PDSCH, or other channels, UE 115 may be able to receive control information or data from network entity 350.

At some time prior to expiration of DRX active timer 308, UE 115 may determine that a current data transmission to network entity 350 is complete. For example, the data session, or a UL data burst, may be complete if UE 115 determines that no more data is to be transmitted to network entity 350 in the immediate future (e.g., within a particular time period). The determination may be based on a status of buffer 306. For example, UE 115 may determine that the current data transmission (e.g., the data session or the UL data burst) is complete based on determining that buffer 306 is empty (e.g., that no data is stored at buffer 306 for transmission to network entity 350). Alternatively, UE 115 may determine that the current data transmission is not complete based on determining that buffer 306 stores at least one data packet for transmission to network entity 350. Although described as being based on the status of buffer 306, in some other implementations, UE 115 may determine that the current data transmission is complete based on other information, such as an indication from the application layer of an application executed by UE 115. For example, an application requesting transmission of data to network entity 350 may signal to UE 115 that no more data is to be transmitted, at least for a particular time period.

Based on the determination, UE 115 may generate an indication to terminate the DRX active time assigned to UE 115. In some implementations, the indication includes or corresponds to a DRX MAC-CE 372. For example, UE 115 may generate a MAC structure including control information that indicates a request by UE 115 to terminate the DRX active time. In some implementations, DRX MAC-CE 372 may be a one-byte MAC-CE. In other implementations, DRX MAC-CE 372 may have a different size, such as larger than one byte or smaller than one byte. In some implementations, DRX MAC-CE 372 only includes a logical channel identifier (ID) 374 associated with DRX MAC-CE 372 (e.g., no information in addition to logical channel ID 374). For example, a header of DRX MAC-CE 372 may include logical channel ID 374. In some other implementations, DRX MAC-CE 372 includes additional information as well as logical channel ID 374.

UE 115 may transmit DRX MAC-CE 372 to network entity 350. For example, UE 115 may transmit DRX MAC-CE 372 individually, or as part of a message, to network entity 350. In some implementations, DRX MAC-CE 372 is included in a physical uplink shared channel (PUSCH) transmission 370 to network entity 350. In some such implementations, DRX MAC-CE 372 may be included as padding in PUSCH transmission 370. For example, DRX MAC-CE 372 may replace one or more bits reserved as padding within PUSCH transmission 370. The reservation of the padding may be based on a wireless communication standard specification, such as a 3GPP wireless communication standard specification.

In some implementations, UE 115 is configured wait for authorization from network entity 350 before terminating the DRX active time period. To illustrate, network entity 350 may receive downlink communication 376 from UE 115 and determine whether to authorize termination of the DRX active time based on a determination whether a current data transmission to UE 115 is complete (e.g., whether network entity 350 has data for transmission to UE 115, such as a DL data session or a DL data burst). In some implementations, the determination is based on a status of buffer 360. For example, if buffer 360 is empty, network entity 350 may determine that there is no data to be transmitted to UE 115 (e.g., that the current DL data transmission is completed). Based on this determination, network entity 350 may determine to authorize termination of the DRX active time at UE 115. However, if buffer 360 stores at least one data packet (or network entity 350 otherwise determines that the DL data transmission is not complete), network entity 350 may determine that there is data to be transmitted to UE 115 (e.g., that a data session or a DL data burst is not complete). Based on this determination, network entity 350 may determine not to authorize termination of the DRX active time at UE 115. Although described as being based on the status of buffer 360, in some other implementations, network entity 350 may determine that the data session or the DL data burst is complete based on other information, such as an indication from the application layer of an application executed by network entity 350.

Based on a determination to terminate the DRX active time at UE 115, network entity 350 may generate and transmit downlink communication 376 to UE 115. In some implementations, downlink communication 376 includes or corresponds to a DRX MAC-CE. In some such implementations, downlink communication 376 is a one-byte MAC-CE that only includes a logical channel ID associated with downlink communication 376. In some other implementations, downlink communication 376 has a different size or includes other information. Network entity 350 may transmit downlink communication 376 to UE 115 individually or in a message. For example, downlink communication 376 may be included in a PDCCH transmission to UE 115. In some implementations, downlink communication 376 may be included in bits reserved as padding of the PDCCH transmission.

Receipt of downlink communication 376 may enable UE 115 to terminate the DRX active time at UE 115. For example, UE 115 may receive downlink communication 376 and may terminate the DRX active time based on receiving downlink communication 376. In some implementations, terminating the DRX active time may include terminating (e.g., stopping) DRX active timer 308. Based on terminating the DRX active time, UE 115 may transition into a low power operating mode (e.g., a "sleep" mode). For example, UE 115 may power down one or more of processor 302, transmitter 312, receiver 314, one or more other components, portions thereof, or a combination thereof. During operation in the low power operating mode, UE 115 does not monitor one or more channels, such as the PDCCH or the PDSCH, for transmissions from network entity 350. UE 115 may remain in the low power operating mode for a remainder of a current DRX cycle. A duration of the DRX cycle may be preconfigured at UE 115.

Based on a determination not to terminate the DRX active time at UE 115, network entity 350 may not transmit any DRX MAC-CEs to UE 115. Instead, network entity 350 may transmit a DL communication 378 to UE 115 based on a determination that the current DL transmission is not complete (e.g., a determination that data is stored in buffer 360 or that an indication has been received from an application, as non-limiting examples). DL communication 378 may be configured to schedule transmission of at least a portion of the data or may include at least a portion of the data. UE 115 may maintain (e.g., remain in) the active operating mode if a DRX MAC-CE, such as downlink communication 376, is not received from network entity 350. Thus, UE 115 may be monitoring the PDCCH or the PDSCH for DL communication 378 from network entity 350. In some implementations, UE 115 may restart DRX active timer 308 based on receiving DL communication 378 from network entity 350.

In some other implementations, UE 115 is configured to terminate the DRX active time period without explicit authorization from network entity 350, such as receipt of the DRX MAC-CE 372. In some such implementations, UE 115 may initiate transmission timer 310 based on transmitting DRX MAC-CE 372 to network entity 350. A duration of transmission timer 310 may be based on a processing timer of network entity 350 associated with DRX MAC-CE 372 and a reception time of a DL communication from network entity 350 at UE 115. For example, the duration of transmission timer 310 may be at least the amount of time that network entity 350 takes to process DRX MAC-CE 372 combined with the amount of time required for UE 115 to receive a DL assignment of additional data from network entity 350. In some implementations, the duration of transmission timer 310 is approximately 4 ms. For example, the amount of time that network entity 350 takes to process DRX MAC-CE 372 may be approximately 3 ms, and the amount of time to receive a DL communication from network entity 350 may be approximately 1 ms. In other implementations, the duration of transmission timer 310 is less than 4 ms or greater than 4 ms.

UE 115 may terminate the DRX active time based on expiration of transmission timer 310 without receipt of a DL communication from network entity 350. For example, if UE 115 does not receive a DL assignment of additional data from network entity 350 by the expiration of transmission timer 310, UE 115 may terminate the DRX active time. In some implementations, terminating the DRX active time includes terminating (e.g., stopping) DRX active timer 308. Based on terminating the DRX active time, UE 115 may transition into the low power operating mode. UE 115 may remain in the low power operating mode for a remainder of a current DRX cycle. During operation in the low power operating mode, UE 115 may not monitor one or more channels, such as the PDCCH or the PDSCH, for DL communications from network entity 350.

If network entity 350 determines that UE 115 should not terminate the DRX active time, network entity 350 may generate and transmit DL communication 378 to UE 115. For example, network entity 350 may transmit DL communication 378 based on a determination that buffer 360 is not empty (e.g., stores data), or based on an indication from the application layer. DL communication 378 may be configured to schedule transmission of at least a portion of the data or may include at least a portion of the data. UE 115 may receive DL communication 378 from network entity 350 and may maintain (e.g., remain in) the active operating mode based on receipt of DL communication 378. UE 115 may then monitor the PDCCH or the PDSCH for additional DL communications from network entity 350. In some implementations, UE 115 may restart DRX active timer 308 based on receiving DL communication 378 from network entity 350.

Additionally or alternatively, network entity 350 may determine that a transport block (TB) associated with DRX MAC-CE 372 is not successfully received at network entity 350. For example, the TB may have too many errors to be decodable, or may not be received by network entity 350. Based on this determination, network entity 350 may generate and transmit a hybrid automatic repeat request (HARQ) retransmission grant 380 to UE 115. HARQ retransmission grant 380 may indicate the TB associated with DRX MAC-CE 372 and may request retransmission of the TB. UE 115 may receive HARQ retransmission grant 380 and, based on receiving HARQ retransmission grant 380 prior to expiration of transmission timer 310, UE 115 may restart transmission timer 310. For example, UE 115 may retransmit the TB and DRX MAC-CE 372 to network entity 350 and may restart transmission timer 310 upon retransmission of DRX MAC-CE 372.

As described with reference to FIG. 3, the present disclosure provides techniques for enabling UE-initiated DRX MAC-CEs. For example, UE 115 may transmit DRX MAC-CE 372 to network entity 350 based on a determination that UE 115 has no more data to transmit to network entity 350, at least for a particular time period. Because DRX MAC-CE 372 may be a one-byte MAC-CE that only includes logical channel ID 374, DRX MAC-CE 372 may be transmitted quickly and may have low overhead with respect to wireless communications system 300. Additionally, because UE 115 may transition into the low power operating mode, based on either receipt of DRX MAC-CE 372 or expiration of transmission timer 310, UE 115 may transition into the low power operating mode prior to expiration of DRX active timer 308, which reduces power consumption at UE 115. Enabling UE-initiated requests to terminate the DRX active time may reduce power consumption of particular types of UEs, such as UEs configured to perform XR, AR, or VR applications, battery powered video cameras, or wearable devices (e.g., smart watches, fitness devices, etc.), which would otherwise result in greater power consumption using typical DRX techniques.

Figures 4, 5:
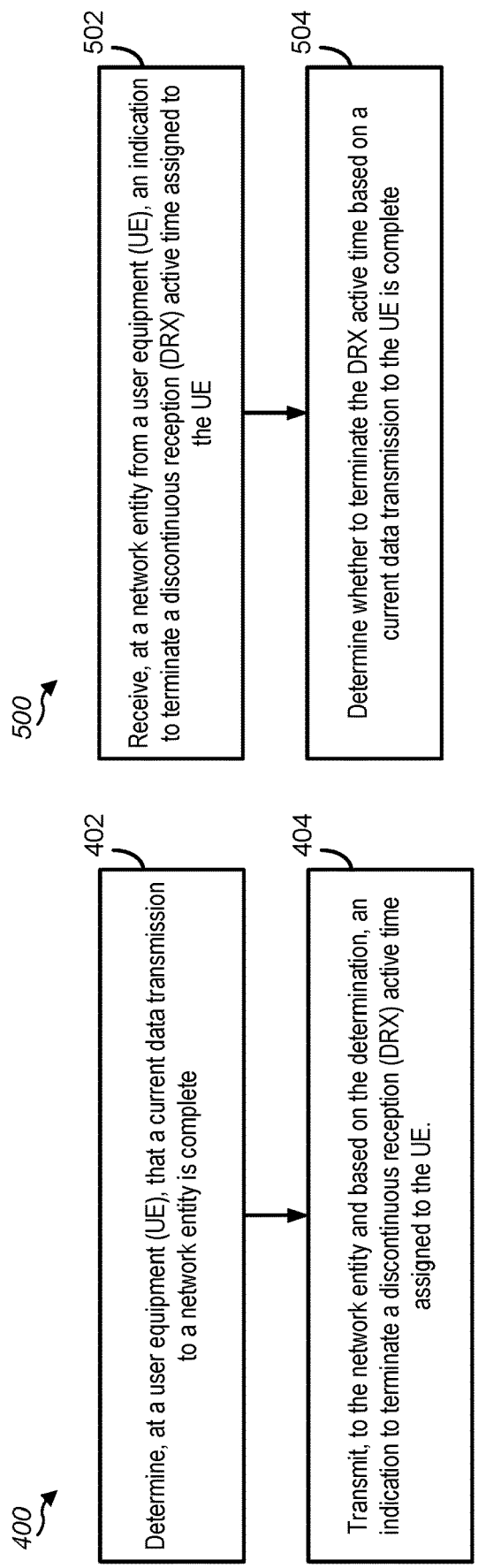
FIG. 4 is a flow diagram illustrating an example process of UE operations for transmitting a DRX MAC-CE according to one or more aspects.
FIG. 5 is a flow diagram illustrating an example process of network entity operations for receiving a DRX MAC-CE according to one or more aspects.
Figure 6:
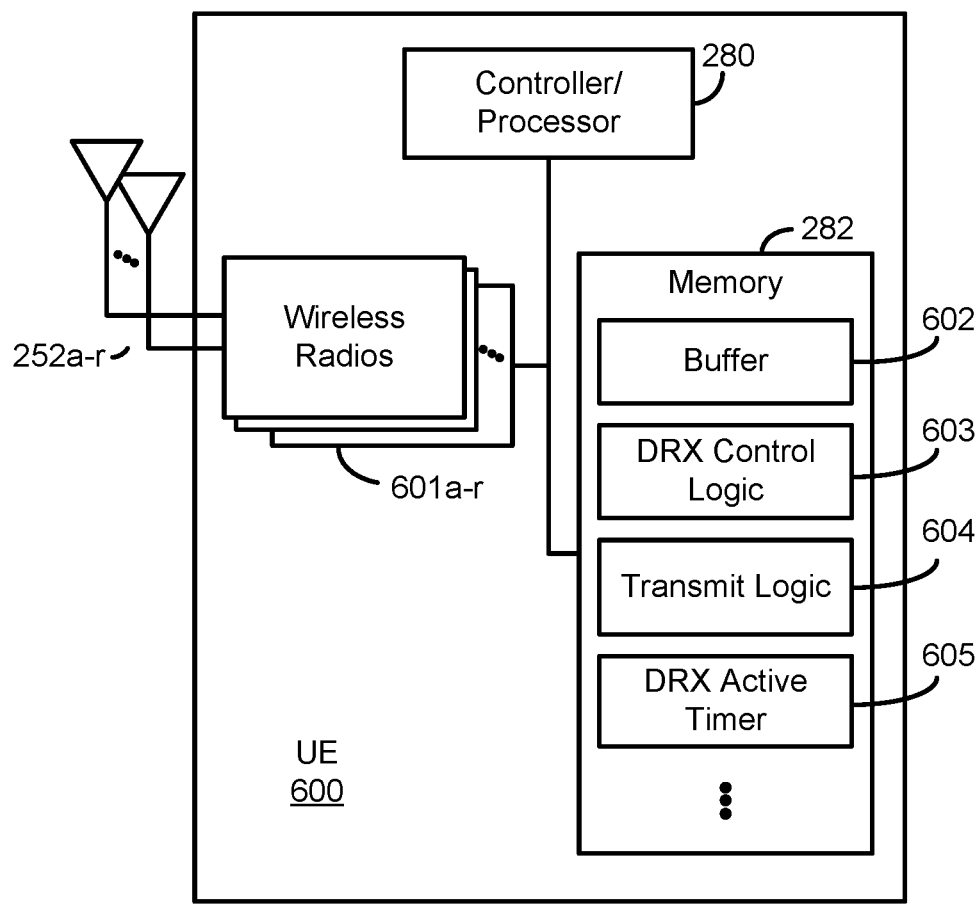
FIG. 6 is a block diagram illustrating an example of a UE configured to transmit a DRX MAC-CE according to one or more aspects.

Referring to FIG. 4, a flow diagram illustrating an example process 400 performed by a UE for transmitting a DRX MAC-CE according to one or more aspects is shown. Example operations (also referred to as "blocks") of the process 400 will also be described with respect to UE 600 as illustrated in FIG. 6. FIG. 6 is a block diagram illustrating an example UE 600 configured to transmit a DRX MAC-CE according to one or more aspects. UE 600 includes the structure, hardware, and components as illustrated for UE 115 of FIG. 2 or 3. For example, UE 600 includes controller 280, which operates to execute logic or computer instructions stored in memory 282, as well as controlling the components of UE 600 that provide the features and functionality of UE 600. UE 600, under control of controller 280, transmits and receives signals via wireless radios 601a-r and antennas 252a-r. Wireless radios 601a-r include various components and hardware, as illustrated in FIG. 2 for UE 115, including modulator or demodulators 254a-r, MIMO detector 256, receive processor 258, transmit processor 264, and TX MIMO processor 266.

Figure 7:
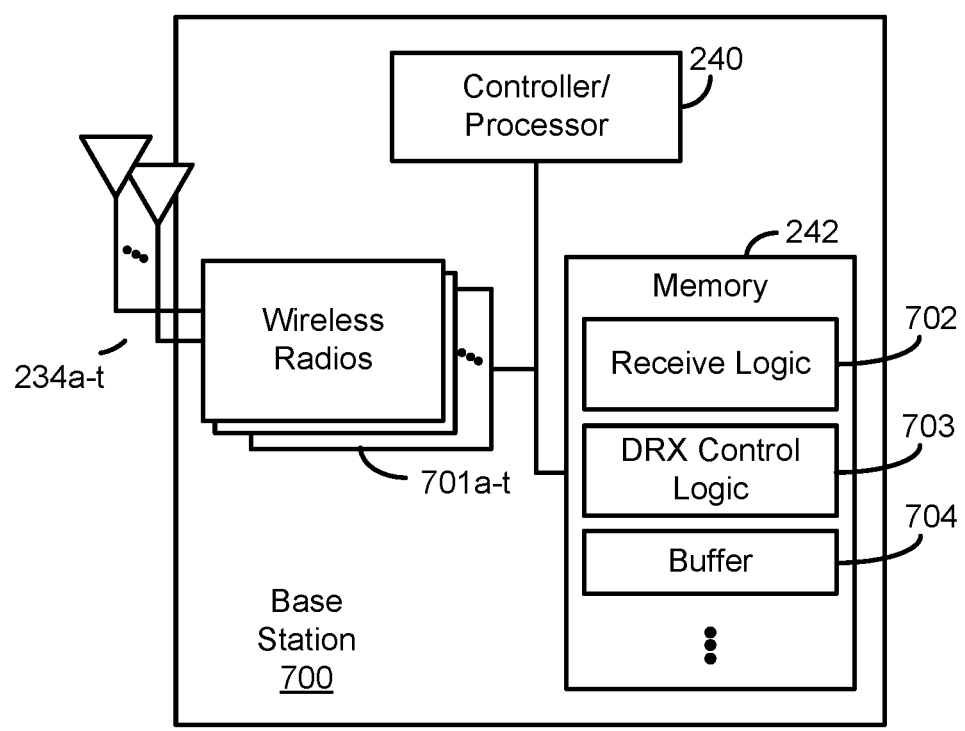
FIG. 7 is a block diagram illustrating an example network entity configured to receive a DRX MAC-CE according to one or more aspects.

As shown, memory 282 may include buffer 602, DRX control logic 603, transmit logic 604, and DRX active timer 605. Buffer 602 may be configured to store data for transmission to a network entity. DRX control logic 603 may be configured to control a DRX active time at UE 600, such as by terminating the DRX active time. Transmit logic 604 may be configured to enable transmission of signaling or messages to a base station. DRX active timer 605 may be configured to track the DRX active time at UE 600. UE 600 may receive signals from or transmit signals to one or more network entities, such as base station 105 of FIGS. 1-2, network entity 350 of FIG. 3, a core network, a core network device, or a network entity as illustrated in FIG. 7.

Referring to FIG. 4, a flow diagram illustrating process 400 is shown. In some implementations, process 400 may be performed by UE 115 or UE 600. In some other implementations, process 400 may be performed by an apparatus configured for wireless communication. For example, the apparatus may include at least one processor, and a memory coupled to the processor. The processor may be configured to perform operations of process 400. In some other implementations, process 400 may be performed or executed using a non-transitory computer-readable medium having program code recorded thereon. The program code may be program code executable by a computer for causing the computer to perform operations of process 400.

As illustrated at block 402, UE 600 determines that a current data transmission to a network entity is complete. As an example of block 402, UE 600 may execute, under control of controller 280, DRX control logic 603 stored in memory 282. The execution environment of DRX control logic 603 provides the functionality to determine that a current data transmission to a network entity is complete. In some implementations, this determination may be based on determining that buffer 602 is empty.

At block 404, UE 600 transmits, to the network entity and based on the determination, an indication to terminate a DRX active time assigned to UE 600. To illustrate, UE 600 may transmit the indication using wireless radios 601a-r and antennas 252a-r. To further illustrate, UE 600 may execute, under control of controller 280, transmit logic 604 stored in memory 282. The execution environment of transmit logic 604 provides the functionality to transmit an indication to terminate a DRX active time assigned to UE 600 to the network entity. Terminating the DRX active time may include terminating DRX active timer 605.

In some implementations, the indication includes a one-byte MAC-CE. In some such implementations, the one-byte MAC-CE is included as padding in a PUSCH transmission to the network entity. Additionally or alternatively, the one-byte MAC-CE may include a logical channel ID associated with the one-byte MAC-CE.

In some implementations, a determination that the current data transmission is complete is based on detecting that a buffer configured to store data for transmission to the network entity is empty. For example, the determination may be based on detecting that buffer 602 is empty (e.g., contains no data for transmission to the network entity).

In some implementations, process 400 also includes receiving, from the network entity, a downlink communication based on transmitting the indication and terminating the DRX active time based on receiving the downlink communication. In some such implementations, the downlink communication includes or corresponds to a DRX MAC-CE. Additionally, or alternatively, process 400 may further include transitioning into a low power operating mode based on terminating the DRX active time.

In some implementations, process 400 further includes maintaining an active operating mode at the UE if a downlink communication is not received from the network entity. In some such implementations, the downlink communication is a DRX MAC-CE.

In some implementations, process 400 also includes initiating a timer based on transmitting the indication. In some such implementations, a duration of the timer is based on a processing time of the network entity associated with the indication and a reception time of a downlink communication from the network entity at the UE. Additionally or alternatively, process 400 also includes terminating the DRX active time based on expiration of the timer without receipt of a downlink communication from the network entity. In some such implementations, process 400 further includes transitioning into a low power operating mode based on terminating the DRX active time. Alternatively, process 400 may further include receiving, prior to expiration of the timer, a downlink communication from the network entity and maintaining an active operating mode at the UE based on receipt of the downlink communication. Alternatively, process 400 may further include receiving, prior to expiration of the timer, a HARQ retransmission grant from the network entity and restarting the timer based on receipt of the HARQ retransmission gran. The HARQ retransmission grant may be associated with a transport block that includes the indication.

As described with reference to FIG. 4, process 400 enables UE-initiated DRX MAC-CE transmission. Because a UE performing the operations of process 400 may transition into a low power operating mode prior to expiration of a DRX active timer, power consumption at the UE may be reduced, as compared to UEs that wait until expiration of the DRX active timer or until receipt of a network entity-initiated DRX MAC-CE.

FIG. 5 is a flow diagram illustrating an example process 500 performed by a network entity for receiving a DRX MAC-CE according to one or more aspects. Example blocks of process 500 will also be described with respect to a network entity 700 as illustrated in FIG. 7. FIG. 7 is a block diagram illustrating an example of network entity 700 configured to receive a DRX MAC-CE according to one or more aspects. Network entity 700 may include base station 105, network entity 350, a network, or a core network, as illustrative, non-limiting examples. Network entity 700 includes the structure, hardware, and components as illustrated for base station 105 of FIGS. 1 and 2, network entity 350 of FIG. 3, or a combination thereof. For example, network entity 700 may include controller 240, which operates to execute logic or computer instructions stored in memory 242, as well as controlling the components of network entity 700 that provide the features and functionality of network entity 700. Network entity 700, under control of controller 240, transmits and receives signals via wireless radios 701a-t and antennas 234a-t. Wireless radios 701a-t include various components and hardware, as illustrated in FIG. 2 for network entity 350 (such as base station 105), including modulator or demodulators 232a-t, transmit processor 220, TX MIMO processor 230, MIMO detector 236, and receive processor 238.

As shown, memory 242 may include receive logic 702, DRX control logic 703, and buffer 704. Receive logic 702 may be configured to receive a DRX MAC-CE from a UE. DRX control logic 703 may be configured to determine whether to terminate a DRX active time at the UE based on buffer 704. Buffer 704 may be configured to store data for transmission to the UE. Network entity 700 may receive signals from or transmit signals to one or more UEs, such as UE 115 of FIGS. 1-3 or UE 600 of FIG. 6.

Returning to FIG. 5, a flow diagram illustrating process 500 is shown. In some implementations, process 500 may be performed by network entity 350 of FIG. 3 or network entity 700 of FIG. 7. In some other implementations, process 500 may be performed by an apparatus configured for wireless communication. For example, the apparatus may include at least one processor, and a memory coupled to the processor. The processor may be configured to perform operations of process 500. In some other implementations, process 500 may be performed or executed using a non-transitory computer-readable medium having program code recorded thereon. The program code may be program code executable by a computer for causing the computer to perform operations of process 500.

As illustrated at block 502, network entity 700 receives, at a network entity from a UE, an indication to terminate a DRX active time assigned to the UE. To illustrate, network entity 700 may receive the indication using wireless radios 701a-t and antennas 234a-t. To further illustrate, network entity 700 may execute, under control of controller 240, receive logic 702 stored in memory 242. The execution environment of receive logic 702 provides the functionality to receive, from a UE, an indication to terminate a DRX active time assigned to the UE.

At block 504, network entity 700 determines whether to terminate the DRX active time based on whether a current data transmission to the UE is complete. As an example of block 504, network entity 700 may execute, under control of controller 240, DRX control logic 703 stored in memory 242. The execution environment of DRX control logic 703 provides the functionality to determine whether to terminate the DRX active time based on whether a current data transmission to a UE is complete. In some implementations, the determination may be based on a status of buffer 704. The status of buffer 704 may indicate whether or not data is stored in buffer 704 for transmission to the UE.

In some implementations, the indication includes a one-byte MAC-CE. In some such implementations, the one-byte MAC-CE is included as padding in a PUSCH transmission to the network entity. Additionally or alternatively, the one-byte MAC-CE may include a logical channel ID associated with the one-byte MAC-CE.

In some implementations, a determination that the current data transmission is complete is based on detecting that a buffer configured to store data for transmission to the UE is empty. For example, the determination may be based on detecting that buffer 704 is empty.

In some implementations, process 500 further includes transmitting, to the UE, a downlink communication based on a determination that the current data transmission is complete. In some such implementations, receipt of the downlink communication at the UE enables termination of the DRX active time at the UE.

In some implementations, process 500 also includes transmitting a downlink communication to the UE based on a determination that the current data transmission is not complete. In some such implementations, the downlink communication is configured to schedule transmission of at least a portion of the data or includes the at least a portion of the data. Additionally or alternatively, process 500 may further include transmitting a HARQ retransmission grant to the UE based on a determination that a transport block associated with the indication is not successfully received at the network entity.

As described with reference to FIG. 5, process 500 enables UE-initiated DRX MAC-CE transmission. Because a network entity performing the operations of process 500 may enable a UE to transition into a low power operating mode prior to expiration of a DRX active timer, power consumption at the UE may be reduced, as compared to UEs that wait until expiration of the DRX active timer or until receipt of a network entity-initiated DRX MAC-CE.

It is noted that one or more blocks (or operations) described with reference to FIGS. 4 and 5 may be combined with one or more blocks (or operations) of another figure. For example, one or more blocks (or operations) of FIG. 4 may be combined with one or more blocks (or operations) FIG. 5. As another example, one or more blocks of FIG. 4 or 5 may be combined with one or more blocks (or operations) of another of FIG. 2 or 3. Additionally, or alternatively, one or more operations described above with reference to FIGS. 1-6 may be combined with one or more operations described with reference to FIG. 7.

In some aspects, techniques for enabling UE-initiated DRX MAC CEs may include additional aspects, such as any single aspect or any combination of aspects described below or in connection with one or more other processes or devices described elsewhere herein. In some aspects, enabling UE-initiated DRX MAC CEs may include an apparatus determining, at a UE, that a current data transmission to a network entity is complete. The apparatus may also transmit, to the network entity and based on the determination, an indication to terminate a DRX active time assigned to the UE. In some implementations, the apparatus includes a wireless device, such as a UE. In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include one or more means configured to perform operations described herein.

In a first aspect, the indication includes a one-byte MAC-CE.

In a second aspect, in combination with the first aspect, the one-byte MAC-CE is included as padding in a PUSCH transmission to the network entity.

In a third aspect, in combination with one or more of the first through second aspects, the one-byte MAC-CE includes a logical channel ID associated with the one-byte MAC-CE.

In a fourth aspect, alone or in combination with one or more of the first through third aspects, a determination that the current data transmission is complete is based on detecting that a buffer configured to store data for transmission to the network entity is empty.

In a fifth aspect, alone or in combination with one or more of the first through fourth aspects, the apparatus receives, from the network entity, a downlink communication based on transmitting the indication and terminates the DRX active time based on receiving the downlink communication.

In a sixth aspect, in combination with the fifth aspect, the downlink communication includes a DRX MAC-CE.

In a seventh aspect, in combination with the fifth aspect, the apparatus transitions into a low power operating mode based on terminating the DRX active time.

In an eighth aspect, alone or in combination with one or more of the first through fourth aspects, the apparatus maintains an active operating mode at the UE if a downlink communication is not received from the network entity.

In a ninth aspect, alone or in combination with one or more of the first through fourth aspects, the apparatus initiates a timer based on transmitting the indication.

In a tenth aspect, in combination with the ninth aspect, a duration of the timer is based on a processing time of the network entity associated with the indication and a reception time of a downlink communication from the network entity at the UE.

In an eleventh aspect, alone or in combination with one or more of the ninth through tenth aspects, the apparatus terminates the DRX active time based on expiration of the timer without receipt of a downlink communication from the network entity.

In a twelfth aspect, in combination with the eleventh aspect, the apparatus transitions into a low power operating mode based on terminating the DRX active time.

In a thirteenth aspect, alone or in combination with one or more of the ninth through tenth aspects, the apparatus receives, prior to expiration of the timer, a downlink communication from the network entity and maintains an active operating mode at the UE based on receipt of the downlink communication.

In a fourteenth aspect, alone or in combination with one or more of the ninth through tenth aspects, the apparatus receives, prior to expiration of the timer, a HARQ retransmission grant from the network entity and restarts the timer based on receipt of the HARQ retransmission grant. The HARQ retransmission grant is associated with a transport block that includes the indication.

In some aspects, an apparatus configured for wireless communication, such as a network entity, is configured to receive, from a UE, an indication to terminate a DRX active time assigned to the UE. The apparatus is also configured to determine whether to terminate the DRX active time based on whether a current data transmission to the UE is complete. In some implementations, the apparatus includes a wireless device, such as a network entity. In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include one or more means configured to perform operations described herein.

In a fifteenth aspect, the indication includes a one-byte MAC-CE.

In a sixteenth aspect, in combination with the fifteenth aspect, the one-byte MAC-CE is included as padding in a PUSCH transmission to the network entity.

In a seventeenth aspect, alone or in combination with one or more of the fifteenth through sixteenth aspects, the one-byte MAC-CE includes a logical channel ID associated with the one-byte MAC-CE.

In an eighteenth aspect, alone or in combination with one or more of the fifteenth through seventeenth aspects, a determination that the current data transmission is complete is based on detecting that a buffer configured to store data for transmission to the UE is empty.

In a nineteenth aspect, alone or in combination with one or more of the fifteenth through eighteenth aspects, the apparatus transmits, to the UE, a downlink communication based on a determination that the current data transmission is complete.

In a twentieth aspect, in combination with the nineteenth aspect, the downlink communication includes a MAC-CE.

In a twenty-first aspect, in combination with the nineteenth aspect, receipt of the downlink communication at the UE enables termination of the DRX active time at the UE.

In a twenty-second aspect, alone or in combination with one or more of the fifteenth through eighteenth aspects, the apparatus transmits a downlink communication to the UE based on a determination that the current data transmission is not complete.

In a twenty-third aspect, in combination with the twenty-second aspect, the downlink communication is configured to schedule transmission of at least a portion of the data or includes the at least a portion of the data.

In a twenty-fourth aspect, alone or in combination with one or more of the fifteenth through eighteenth aspects, the apparatus transmits a HARQ retransmission grant to the UE based on a determination that a transport block associated with the indication is not successfully received at the network entity.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks and modules described herein with respect to FIGS. 4 and 5 may comprise processors, electronics devices, hardware devices, electronics components, logical circuits, memories, software codes, firmware codes, etc., or any combination thereof. In addition, features discussed herein relating to FIGS. 1-7 may be implemented via specialized processor circuitry, via executable instructions, or combinations thereof.

Those of skill would further appreciate that the various illustrative logical blocks, modules, circuits, and algorithm steps (e.g., the logical blocks in FIGS. 5-6) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be implemented directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and Blu-ray disc where disks usually reproduce data magnetically, while discs reproduce data optically with lasers. Combinations of the above should also be included within the scope of computer-readable media.

As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. An apparatus configured for wireless communication, the apparatus comprising:
   at least one processor; and
   memory coupled to the at least one processor,
   wherein the at least one processor, when executing instructions stored in the memory, is configured to cause the apparatus to:

obtain an indication to terminate a discontinuous reception (DRX) active time assigned to a user equipment (UE); and initiate transmission of a hybrid automatic repeat request (HARQ) retransmission grant to the UE responsive to the indication to maintain the DRX active time based on a current data transmission to the UE is not complete, the HARQ retransmission grant being associated with a transport block that includes the indication.

2. The apparatus of claim 1, wherein the indication comprises a medium access control (MAC) control element (MAC-CE) that is included as padding in a physical uplink shared channel (PUSCH) transmission or that includes a logical channel identifier (ID) associated with the MAC-CE.

3. The apparatus of claim 1, wherein the transmission of the HARQ retransmission grant to the UE is initiated prior to expiration of a timer initiated by the UE in association with the UE transmitting the indication.

4. The apparatus of claim 1, wherein the HARQ retransmission grant is initiated for transmission based on a transport block associated with the indication not being successfully received.

5. The apparatus of claim 1, further comprising a buffer configured to store data for transmission to the UE, wherein the HARQ retransmission grant is initiated for transmission based on the buffer being empty.

6. The apparatus of claim 1, further comprising a transceiver configured to receive the indication, wherein the HARQ retransmission grant is initiated for transmission via the transceiver and further wherein the apparatus is configured as a network entity.

7. An apparatus configured for wireless communication, the apparatus comprising:
   at least one processor; and
   memory coupled to the at least one processor,
   wherein the at least one processor, when executing instructions stored in the memory, is configured to cause the apparatus to:
   obtain an indication to terminate a discontinuous reception (DRX) active time assigned to a user equipment (UE); and
   initiate transmission or forego transmission of a downlink communication to the UE responsive to the indication, prior to expiration of a timer initiated by the UE in association with the UE transmitting the indication, to maintain the DRX active time or terminate the DRX active time based on whether a current data transmission to the UE is complete, wherein a duration of the timer is based on a processing time associated with the indication and a time for the UE to receive a downlink communication.

8. The apparatus of claim 7, wherein the indication comprises a medium access control (MAC) control element (MAC-CE).

9. The apparatus of claim 7, wherein the at least one processor, when executing the instructions, is configured to:
   authorize the UE to terminate the DRX active time when the current data transmission is complete.

10. The apparatus of claim 7, wherein the at least one processor, when executing the instructions, is further configured to cause the apparatus to:
    permit termination of the DRX active time by the UE based on expiration of the timer and without a downlink communication to the UE.

11. The apparatus of claim 7, wherein the at least one processor, when executing the instructions, is further configured to cause the apparatus to:
    terminate an active operating mode with respect to the UE.

12. The apparatus of claim 7, wherein the at least one processor, when executing the instructions, is configured to:
    initiate transmission of the downlink communication to the UE to maintain the DRX active time when the current data transmission is not complete.

13. The apparatus of claim 12, wherein the downlink communication includes a hybrid automatic repeat request (HARQ) retransmission grant to the UE since a transport block associated with the indication is not successfully received at the apparatus.

14. The apparatus of claim 7, further comprising a transceiver configured to receive the indication, wherein the apparatus is configured as a network entity.

15. An apparatus configured for wireless communication, the apparatus comprising:
    at least one processor; and
    memory coupled to the at least one processor,
    wherein the at least one processor, when executing instructions stored in the memory, is configured to cause the apparatus to:
    obtain an indication to terminate a discontinuous reception (DRX) active time assigned to a user equipment (UE);
    forego transmission of a downlink communication to the UE responsive to the indication to terminate the DRX active time, the foregoing being based on a current data transmission to the UE being complete; and
    permit termination of the DRX active time by the UE.

16. The apparatus of claim 15, wherein the indication comprises a medium access control (MAC) control element (MAC-CE).

17. The apparatus of claim 15, wherein the foregoing is further based on a buffer configured to store data for transmission to the UE being empty.

18. The apparatus of claim 15, wherein the at least one processor, when executing the instructions, is further configured to cause the apparatus to:
    terminate an active operating mode with respect to the UE.

19. The apparatus of claim 15, wherein termination of the DRX active time by the UE is based on expiration of a timer initiated by the UE in association with the UE transmitting the indication.

20. The apparatus of claim 15, further comprising a transceiver configured to receive the indication, wherein the apparatus is configured as a network entity.

* * * * *